(12) United States Patent
Machida et al.

(10) Patent No.: US 12,012,301 B2
(45) Date of Patent: Jun. 18, 2024

(54) ELEVATOR SYSTEM (71) Applicant: Mitsubishi Electric Corporation, Tokyo (JP)

(72) Inventors: Koki Machida, Tokyo (JP); Junshiro Kanda, Tokyo (JP); Masami Aikawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1589 days.

(21) Appl. No.: 16/309,138

(22) PCT Filed: Oct. 4, 2016

(86) PCT No.: PCT/JP2016/079448
§ 371 (c)(1),
(2) Date: Dec. 12, 2018

(87) PCT Pub. No.: WO2018/066056
PCT Pub. Date: Apr. 12, 2018

(65) Prior Publication Data
US 2019/0315592 A1 Oct. 17, 2019

(51) Int. Cl.
B66B 1/34 (2006.01)
B66B 1/24 (2006.01)
(Continued)

(52) U.S. Cl.
CPC .............. B66B 1/28 (2013.01); B66B 1/2416 (2013.01); B66B 1/3461 (2013.01);
(Continued)

(58) Field of Classification Search
CPC ... B66B 1/3461; B66B 5/0012; B66B 1/3492; B66B 7/02; B66B 2201/103;
(Continued)

(56) References Cited

U.S. PATENT DOCUMENTS

2022/0402724 A1* 12/2022 Jeong .................... B66B 1/2408

FOREIGN PATENT DOCUMENTS

CN 111164036 A * 5/2020 ............... B66B 5/00
EP 3939923 A2 * 1/2022 ............... B66B 1/28
(Continued)

OTHER PUBLICATIONS

International Search Report received for PCT Application No. PCT/JP2016/079448 dated Dec. 27, 2016, 6 pages of search report including 1 page of English Translation.

(Continued)

Primary Examiner — Marlon T Fletcher
(74) Attorney, Agent, or Firm — XSENSUS LLP (57) ABSTRACT An elevator system that allows a plurality of autonomous mobile bodies to be rearranged in an alighting order in a car. The elevator system includes processing circuitry to move and stop an elevator car based on information indicating destination floors transmitted from autonomous mobile bodies, to select an autonomous mobile body in the car and an autonomous mobile body that will board the car as targets to be rearranged. The processing circuitry is further to determine an alighting order of the autonomous mobile bodies to be rearranged based on the destination floor of each of the autonomous mobile bodies to be rearranged, and to transmit information indicating the alighting order to each of the autonomous mobile bodies to be rearranged so that the autonomous mobile bodies are arranged one by one in the alighting order.

16 Claims, 8 Drawing Sheets (51) Int. Cl.
  *B66B 1/28* (2006.01)
  *B66B 11/00* (2006.01)
  *G05D 1/00* (2006.01)

(52) U.S. Cl.
  CPC .......... *B66B 11/006* (2013.01); *G05D 1/0291* (2013.01); *B66B 2201/103* (2013.01); *B66B 2201/4615* (2013.01); *B66B 2201/4653* (2013.01)

(58) Field of Classification Search
  CPC . B66B 2201/215; B66B 11/005; B66B 17/20; B66B 9/16
  See application file for complete search history.

(56) References Cited

FOREIGN PATENT DOCUMENTS

| | | | | |
|---|---|---|---|---|
| JP | 2006089262 A | * | 4/2006 | |
| JP | 4165847 B2 | * | 10/2008 | |
| JP | 2011-57322 A | | 3/2011 | |
| JP | 2012-018645 A | | 1/2012 | |
| JP | 2012017184 A | * | 1/2012 | ........... B66B 1/2458 |
| JP | 2013-216408 A | | 10/2013 | |
| JP | 59-24672 B2 | | 5/2016 | |
| JP | 6308341 B1 | * | 4/2018 | ............... B66B 1/14 |
| JP | WO2019193719 A1 | * | 10/2021 | |
| WO | WO-2018066056 A1 | * | 4/2018 | ............... B66B 1/14 |

OTHER PUBLICATIONS

Chinese Office Action dated Sep. 3, 2020, issued in corresponding Chinese Patent Application No. 201680089621.9.

\* cited by examiner

ELEVATOR SYSTEM

CROSS-REFERENCE TO RELATED APPLICATIONS

This application is a National Stage Application based on PCT/JP2016/079448, filed on 4 Oct. 2016, the entire contents of which being incorporated herein by reference.

FIELD

The present invention relates to an elevator system.

BACKGROUND

Patent Literature 1 mentioned below describes a system for conveying robots using an elevator. This system provides an instruction on an order of boarding a car to a plurality of robots on the same hall.

CITATION LIST

Patent Literature

[PTL 1] JP 5924672 B

SUMMARY

Technical Problem

By the system described in Patent Literature 1, the robots cannot be rearranged in the car. Thus, if a robot newly boards the car on a floor different from destination floors of the robots on board the car, the plurality of robots in the car cannot be arranged in an alighting order.

The present invention has been made to solve the problem described shove. An object thereof is to provide an elevator system that allows a plurality of autonomous mobile bodies to be rearranged in an alighting order in a car.

Solution to Problem

An elevator system according to the present invention includes: an operation control unit configured to move and stop an elevator car based on information indicating destination floors transmitted from autonomous mobile bodies having a travel mechanism and a travel control unit 13 and being capable of boarding and alighting from the car; a target selection unit configured to select an autonomous mobile body in the car and an autonomous mobile body that will board the car as targets to be rearranged, an alighting order determination unit configured to determine an alighting order of the autonomous mobile bodies to be rearranged based on the destination floor of each of the autonomous mobile bodies to be rearranged selected by the target selection unit; and a rearrangement instruction unit configured to transmit information indicating the alighting order determined by the alighting order determination unit to each of the autonomous mobile bodies to be rearranged.

Advantageous Effects of Invention

In the elevator system according to the present invention, the target selection unit selects the autonomous mobile body in the car and the autonomous mobile body that will board the car as the targets to be rearranged. The alighting order determination unit determines the alighting order of the autonomous mobile bodies to be rearranged. The rearrangement instruction unit transmits the information indicating the alighting order determined by the alighting order determination unit to each of the autonomous mobile bodies to be rearranged. Thus, according to the present invention, the plurality of autonomous mobile bodies can be rearranged in the alighting order in the car.

DESCRIPTION OF EMBODIMENTS

With reference to the accompanying drawings, an elevator system will be described in detail. In the drawings, the same or corresponding components are denoted by the same reference numerals. Overlapping descriptions will be simplified or omitted as appropriate.

Embodiment 1

Figure 1:
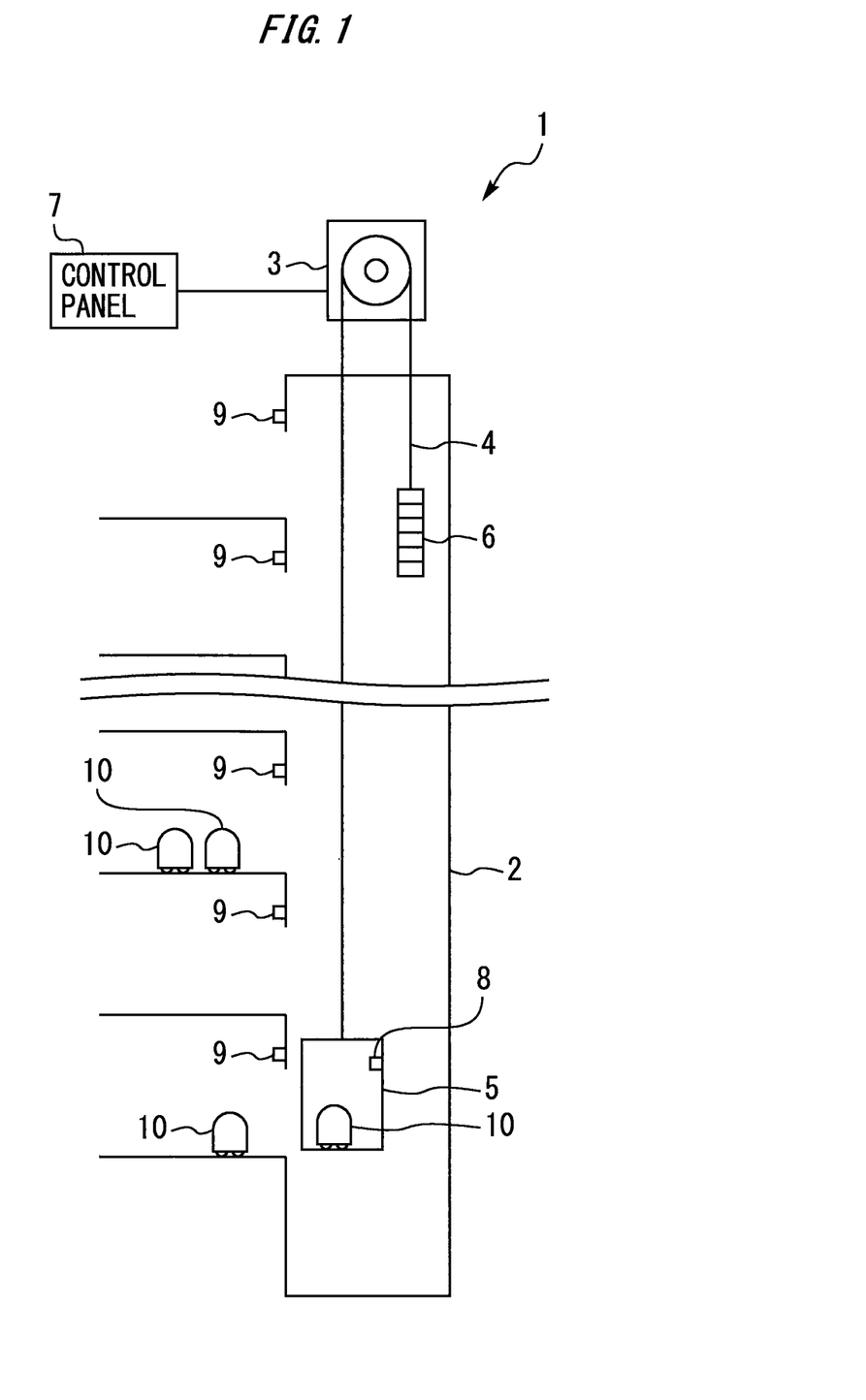
FIG. 1 is a schematic diagram of an exemplary structure of an elevator system according to Embodiment 1.

FIG. 1 is a schematic diagram of an exemplary structure of an elevator system according to Embodiment 1.

As shown in FIG. 1, an elevator system 1 includes a hoistway 2, a traction machine 3, ropes 4, a car 5, a counterweight 6, and a control panel 7. The hoistway 2 is formed, for example, to extend through floors of a building (not shown). The traction machine 3 is provided, for example, in a machine room (not shown) or the like. The ropes 4 is wound around the traction machine 3. The car 5 and the counterweight 6 are suspended by the ropes 4 in the hoistway 2. The traction machine 3 is driven to move the car 5 and the counterweight 6 up and down. The traction machine 3 is controlled by the control panel 7.

As shown in FIG. 1, a car communication device 8 is provided in the car 5. The car communication device 8 is provided, for example, on a wall surface or a ceiling in the car 5. The car communication device 8 has a function of communicating with the control panel 7. The car communication device 8 is, for example, electrically connected to the control panel 7.

As shown in FIG. 1, a plurality of exterior communication devices 9 are provided in the building. Each exterior communication device 9 is provided, for example, on a wall surface or a ceiling in the building. Each exterior communication device 9 is provided, for example, on a hall of each floor. The exterior communication device 9 has a function of communicating with the control panel 7. The exterior communication device 9 is, for example, electrically connected to the control panel 7.

As shown in FIG. 1, there are a plurality of autonomous mobile bodies 10 in the building. The autonomous mobile bodies 10 each have a travel mechanism and are autonomously movable. The autonomous mobile bodies 10 are, for example, cleaning robots or guard robots.

The autonomous mobile bodies 10 can board and alight from the car 5. The autonomous mobile bodies 10 board, for example, the car 5 which no human users board. The autonomous mobile bodies 10 may board, for example, the car 5 during hours when no human users exist in the building. The autonomous mobile bodies 10 may board, for example, the car 5 set so that no human users board it.

Figure 2:
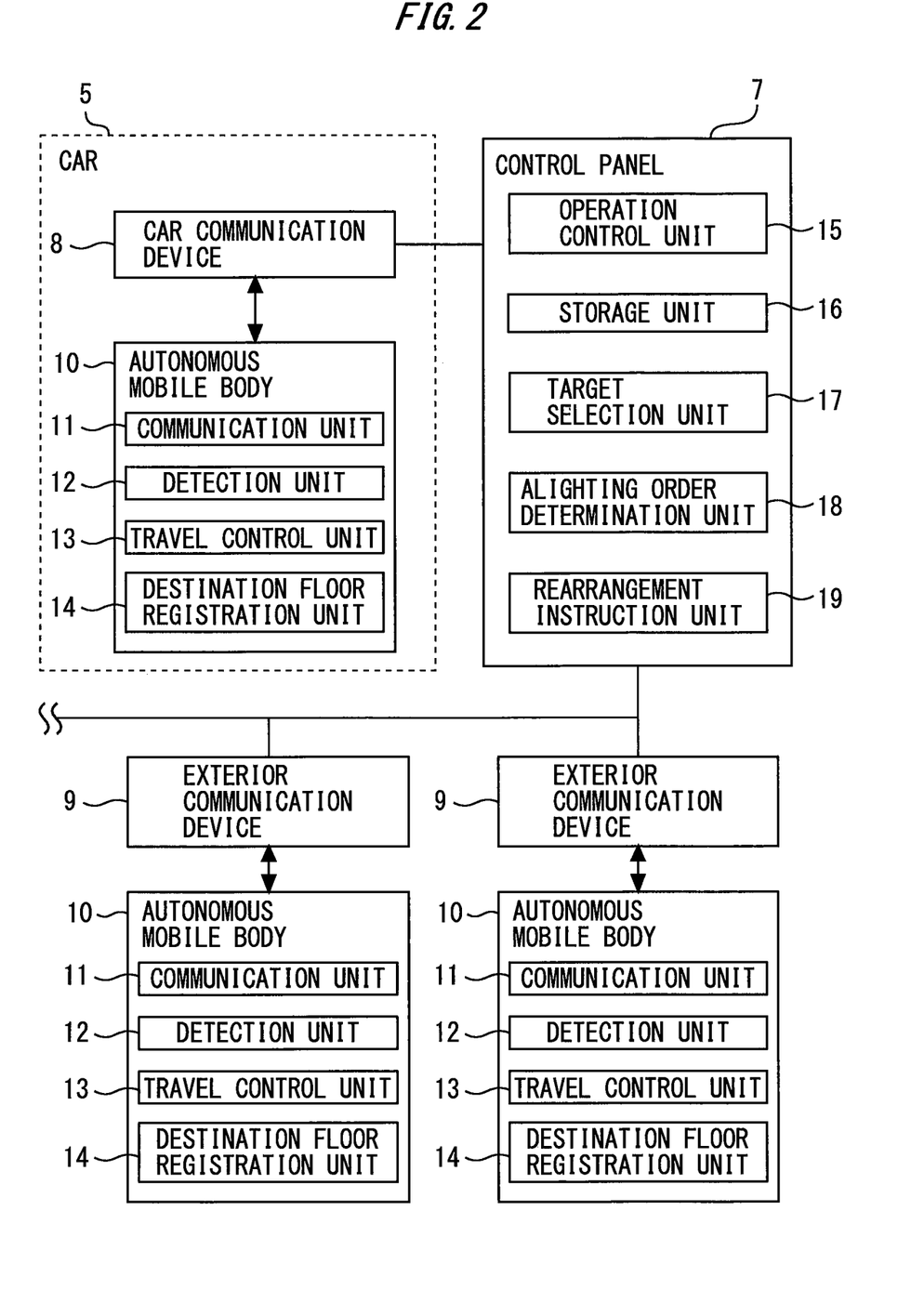
FIG. 2 is a configuration diagram of the elevator system according to Embodiment 1.

FIG. 2 is a configuration diagram of the elevator system according to Embodiment 1.

As shown in FIG. 2, the autonomous mobile body 10 includes a communication unit 11, a detection unit 12, a travel control unit 13, and a destination floor registration unit 14. The control panel 7 includes an operation control unit 15, a storage unit 16, a target selection unit 17, an alighting order determination unit 18, and a rearrangement instruction unit 19.

The communication unit 11 wirelessly communicates with the car communication device 8 and the exterior communication device 9. Specifically, the autonomous mobile body 10 has a function of wirelessly communicating with the control panel 7 via the car communication device 8 or the exterior communication device 9.

The communication unit 11 may, for example, wirelessly communicate with other communication units 11. Specifically, the autonomous mobile body 10 may, for example, have a function of wirelessly communicating with other autonomous mobile bodies 10.

The detection unit 12 detects, for example, an object around the autonomous mobile body 10. The detection unit 12 is, for example, a distance sensor that detects a horizontal distance between the autonomous mobile body 10 and the object.

The travel control unit 13 operates the travel mechanism of the autonomous mobile body 10 to move the autonomous mobile body 10. The travel control unit 13 automatically moves the autonomous mobile body 10, for example, without an external operation or signal. The travel control unit 13 moves the autonomous mobile body 10, for example, so as not to be brought into contact with an obstacle based on a detection result by the detection unit 12.

The destination floor registration unit 14 outputs information indicating a destination floor of the autonomous mobile body 10. The destination floor of the autonomous mobile body 10 is determined, for example, by the autonomous mobile body 10.

When the destination floor registration unit 14 outputs the information indicating the destination floor, the communication unit 11 of the autonomous mobile body 10 transmits the information indicating the destination floor and identification information of the autonomous mobile body 10 to the control panel 7. The control panel 7 receives the information indicating the destination floor and the identification information from the autonomous mobile body 10, and thus a call is generated for the autonomous mobile body 10 to travel to its destination floor from the floor on which the autonomous mobile body 10 is located as a boarding floor. Specifically, the control panel 7 detects on which floor the call is generated by the autonomous mobile body 10 and what identification information the autonomous mobile body 10 has. The boarding floor of the autonomous mobile body 10 is detected, for example, based on an installation floor of the exterior communication device 9 that relays transmission of the information from the autonomous mobile body 10.

The operation control unit 15 controls driving of the traction machine 3 to move and stop the car 5. The operation control unit 15 stops the car 5 on the boarding floor on which the autonomous mobile body 10 that has generated the call is waiting. The autonomous mobile body 10 boards the car 5 on the boarding floor. The operation control unit 15 stops the car 5 on the destination floor of the autonomous mobile body 10. The autonomous mobile body 10 alights from the car 5 on the destination floor. Specifically, a stop floor of the car 5 is a floor corresponding to at least one of the boarding floor and the destination floor.

The storage unit 16 stores, for example, the information indicating the destination floor of the autonomous mobile body 10 that has generated the call in association with the identification information of the autonomous mobile body 10. Specifically, the storage unit 16 stores a destination floor for each autonomous mobile body 10. The storage unit 16 may store, for example, a boarding floor for each autonomous mobile body 10. The storage unit 16 holds information of autonomous mobile bodies 10 that have not yet reached the destination floors. The storage unit 16 does not hold, for example, information of autonomous mobile bodies 10 that have already reached the destination floors.

The target selection unit 17 selects an autonomous mobile body 10 currently on board the car 5 and an autonomous mobile body 10 that will board the car 5 as targets to be rearranged. The selection by the target selection unit 17 is performed, for example, based on memory contents of the storage unit 16. The selection by the target selection unit 17 is performed, for example, every time the autonomous mobile body 10 generates a call. The selection by the target selection unit 17 is performed, for example, during traveling of the car 5.

The target selection unit 17 selects, for example, an autonomous mobile body 10 whose destination floor is not a next stop floor among the autonomous mobile bodies 10 currently on board the car 5 as a target to be rearranged. The target selection unit 17 does not select, for example, an autonomous mobile body 10 whose destination floor is the next step floor among the autonomous mobile bodies 10 currently on board the car 5 as a target to be rearranged.

The target selection unit 17 may select only part of the autonomous mobile bodies 10 that will board the car 5 as a target/targets to be rearranged according to a current position of the car 5. The target selection unit 17 may select, for example, only an autonomous mobile body 10 located on a floor that is the next stop floor among the autonomous mobile bodies 10 that will board the car 5 as a target to be rearranged. The target selection unit 17 may select, for example, autonomous mobile bodies 10 located on floors that are the next stop floor and the second stop floor among the autonomous mobile bodies 10 that will board the car 5 as targets to be rearranged.

The alighting order determination unit 18 determines an alighting order of the autonomous mobile bodies 10 to be rearranged based on the respective destination floors of the autonomous mobile bodies 10 to be rearranged selected by the target selection unit 17. The later the car 5 reaches a destination floor of a certain autonomous mobile body 10, the later the alighting order of the autonomous mobile body 10 is. The determination of the alighting order by the alighting order determination unit 18 is performed, for example, based on the memory contents of the storage unit 16. The determination of the alighting order by the alighting order determination unit 18 is performed, for example, every time the target selection unit 17 performs selection. Specifically, the alighting order is updated, for example, every time the autonomous mobile body 10 generates a call. The alighting order is not necessarily changed even if updated.

The rearrangement instruction unit 19 transmits information to the autonomous mobile body 10 via the car communication device 8 and the exterior communication device 9. The rearrangement instruction unit 19 transmits information indicating the alighting order determined by the alighting order determination unit 18 to each of the autonomous mobile bodies 10 to be rearranged. The information indicating the alighting order transmitted from the rearrangement instruction unit 19 is, for example, information indicating the alighting order of all of the plurality of autonomous mobile bodies 10 to be rearranged.

The travel control unit 13 of the autonomous mobile body 10 operates the travel mechanism of the autonomous mobile body 10 based on the information transmitted from the rearrangement instruction unit 19 to change a position of the autonomous mobile body 10 relative to positions of other autonomous mobile bodies 10. The travel control unit 13 of the autonomous mobile body 10 moves the autonomous mobile body 10, for example, so as not to be brought into contact with other autonomous mobile bodies 10 in the car 5 based on the detection result by the detection unit 12.

The travel control unit 13 of the autonomous mobile body 10 moves the autonomous mobile body 10, for example, so as to be located on a back side of the car 5 as compared to other autonomous mobile bodies 10 that will alight earlier than the autonomous mobile body 10. The travel control unit 13 of the autonomous mobile body 10 moves the autonomous mobile body 10, for example, so as to be located on a front side of the car 5 as compared to other autonomous mobile bodies 10 that will alight later than the autonomous mobile body 10.

The alighting order determination unit 18 may estimate an autonomous mobile body 10 that prevents another autonomous mobile body 10 from boarding the car 5 from a hall on a boarding floor among the autonomous mobile bodies 10 to be rearranged. The estimation of the autonomous mobile body 10 that prevents another autonomous mobile body 10 from boarding the car 5 is performed, for example, based on the memory contents of the storage unit 16 or the alighting order. When there is an autonomous mobile body 10 estimated to prevent another autonomous mobile body 10 from boarding the car 5 by the alighting order determination unit 18, the rearrangement instruction unit 19 may transmit instructions to wait outside the car 5 to the autonomous mobile body 10. The travel control unit 13 of the autonomous mobile body 10 having received the wait instruction temporarily moves the autonomous mobile body 10 outside the car 5 on the boarding floor of another autonomous mobile body 10.

Figure 3:
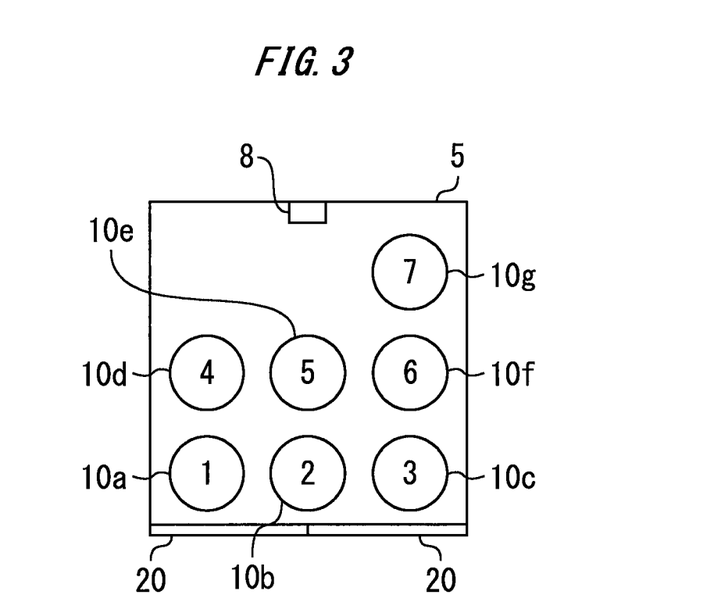
FIG. 3 is a first plan view illustrating rearrangement of autonomous mobile bodies in Embodiment 1.
Figure 4:
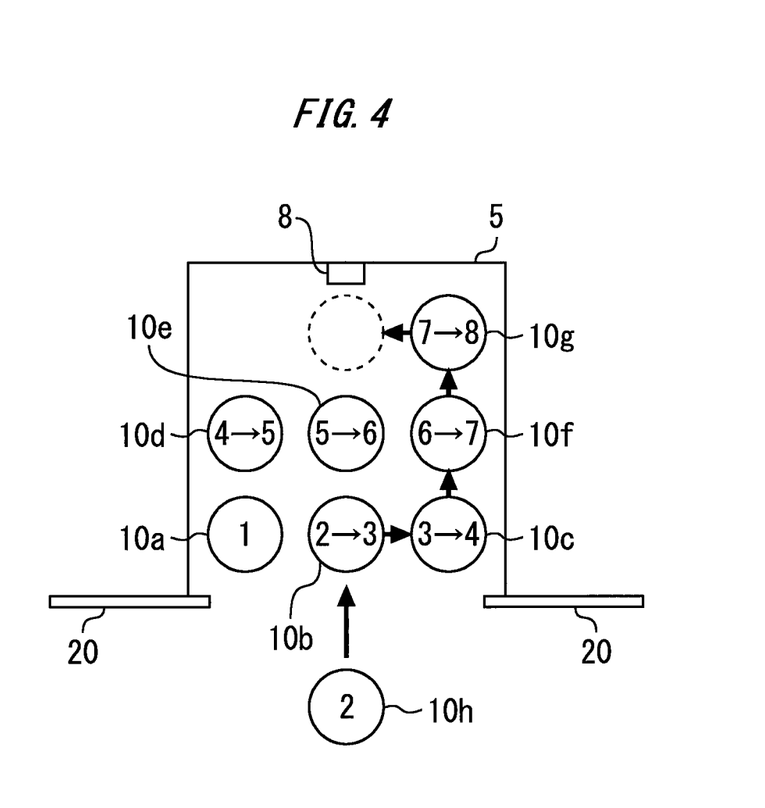
FIG. 4 is a second plan view illustrating rearrangement of the autonomous mobile bodies in Embodiment 1.
Figure 5:
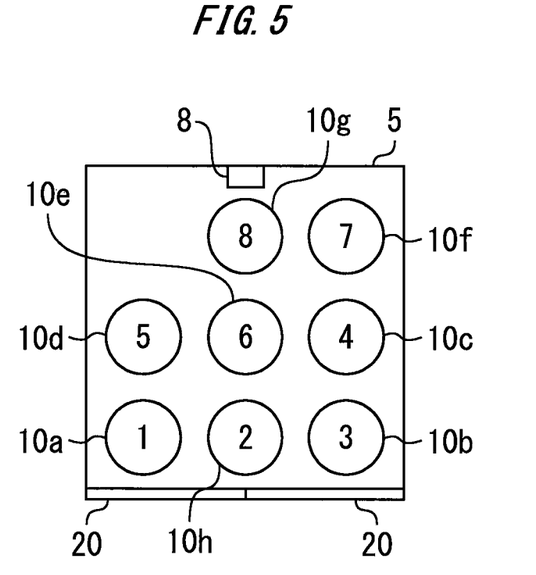
FIG. 5 is a third plan view illustrating rearrangement of the autonomous mobile bodies in Embodiment 1.

FIG. 3 is a first plan view illustrating rearrangement of the autonomous mobile bodies in Embodiment 1. FIG. 4 is a second plan view illustrating rearrangement of the autonomous mobile bodies in Embodiment 1. FIG. 5 is a third plan view illustrating rearrangement of the autonomous mobile bodies in Embodiment 1.

In FIGS. 3 to 5, the plurality of autonomous mobile bodies 10 are distinguished by reference numerals with alphabets. The numbers in circles showing the autonomous mobile bodies 10 indicate the alighting order of the autonomous mobile bodies 10. Now, with reference to FIGS. 3 to 5, a first specific example of the rearrangement of the autonomous mobile bodies 10 will be described.

FIG. 3 shows seven autonomous mobile bodies 10 being on board the car 5 during traveling. As shown in FIG. 3, autonomous mobile bodies 10a, 10b, 10c that alight first to third are located on the front side in the car 5. Specifically, the autonomous mobile bodies 10a, 10b, 10c are located near a car door 20. An autonomous mobile body 10g that alights seventh is located on the back side in the car 5. Autonomous mobile bodies 10d, 10e, 10f that alight fourth to sixth are located in the middle in a depth direction in the car 5.

FIGS. 4 and 5 show an autonomous mobile body 10h boarding the car 5 shown in FIG. 3. When the alighting order of the autonomous mobile body 10h is determined to be second, the alighting order of the autonomous mobile bodies 10 in the car 5 other than the autonomous mobile body 10a is deferred one by one. Then, for example, when the autonomous mobile bodies 10b, 10c, 10f, 10g are moved in the car 5 as shown by arrows in FIG. 4, a space is created for the autonomous mobile body 10h to board. Then, when the autonomous mobile body 10h boards the car 5, the state in FIG. 5 is reached.

Figure 6:
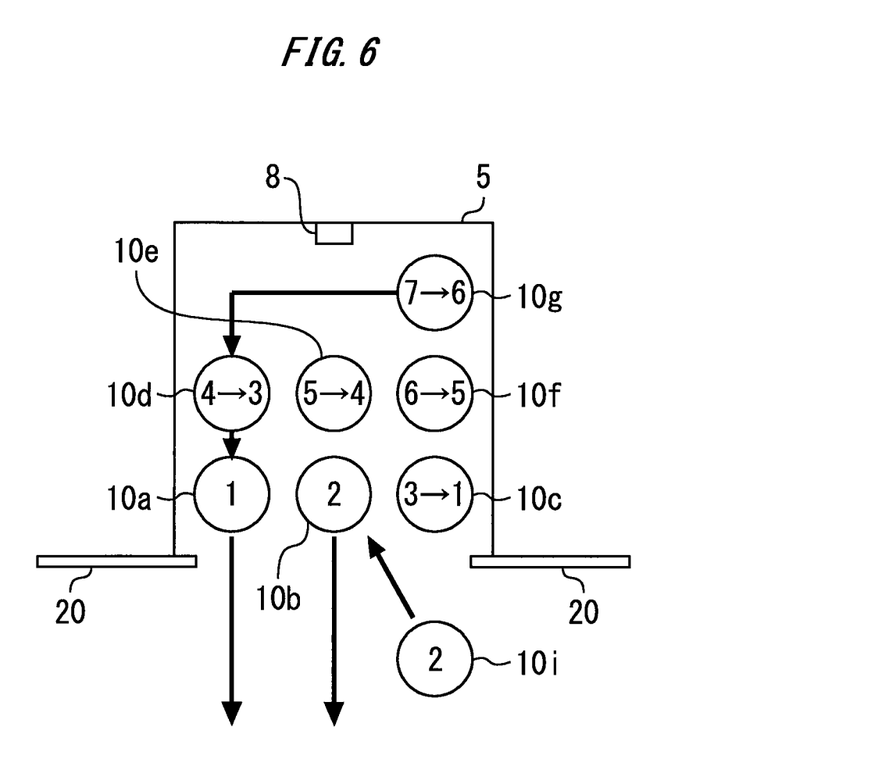
FIG. 6 is a fourth plan view illustrating rearrangement of the autonomous mobile bodies in Embodiment 1.
Figure 7:
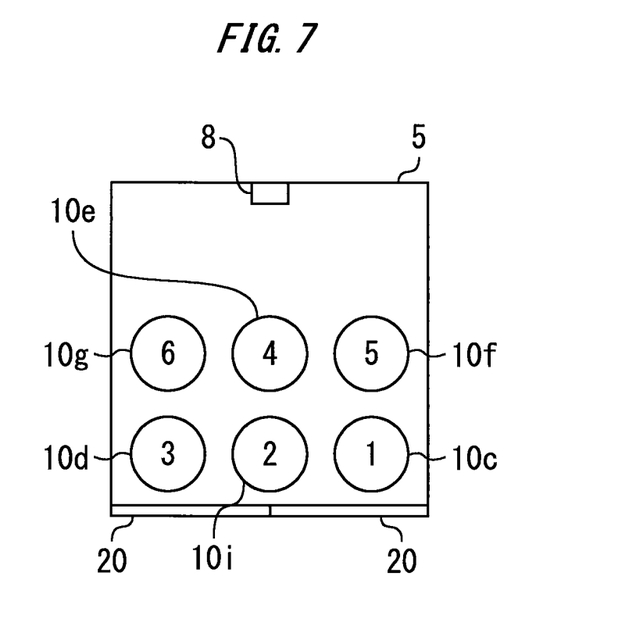
FIG. 7 is a fifth plan view illustrating rearrangement of the autonomous mobile bodies in Embodiment 1.

FIG. 6 is a fourth plan view illustrating rearrangement of the autonomous mobile bodies in Embodiment 1. FIG. 7 is a fifth plan view illustrating rearrangement of the autonomous mobile bodies in Embodiment 1.

In FIGS. 6 and 7, the plurality of autonomous mobile bodies 10 are distinguished by reference numerals with alphabets. The numbers in circles showing the autonomous mobile bodies 10 indicate the alighting order of the autonomous mobile bodies 10. Now, with reference to FIGS. 3, 6 and 7, a second specific example of the rearrangement of the autonomous mobile bodies 10 will be described.

FIGS. 6 and 7 show the autonomous mobile bodies 10a, 10b alighting from the car 5 shown in FIG. 3 and an autonomous mobile body 10i boarding on the same floor. When the alighting order of the autonomous mobile body 10i is determined to be second, the alighting order of the autonomous mobile body 10c is moved up to first. When the alighting order of the autonomous mobile body 10i is determined to be second, the alighting order of the autonomous mobile bodies 10d, 10e, 10f, 10g is moved down one by one. Then, when the autonomous mobile bodies 10a, 10b alight from the car 5 as shown by arrows in FIG. 6, a space is created on the front side in the car 5. Then, when the autonomous mobile body 10i boards and the autonomous mobile bodies 10d, 10g are moved toward the front side in the car 5, the state in FIG. 7 is reached.

Figure 8:
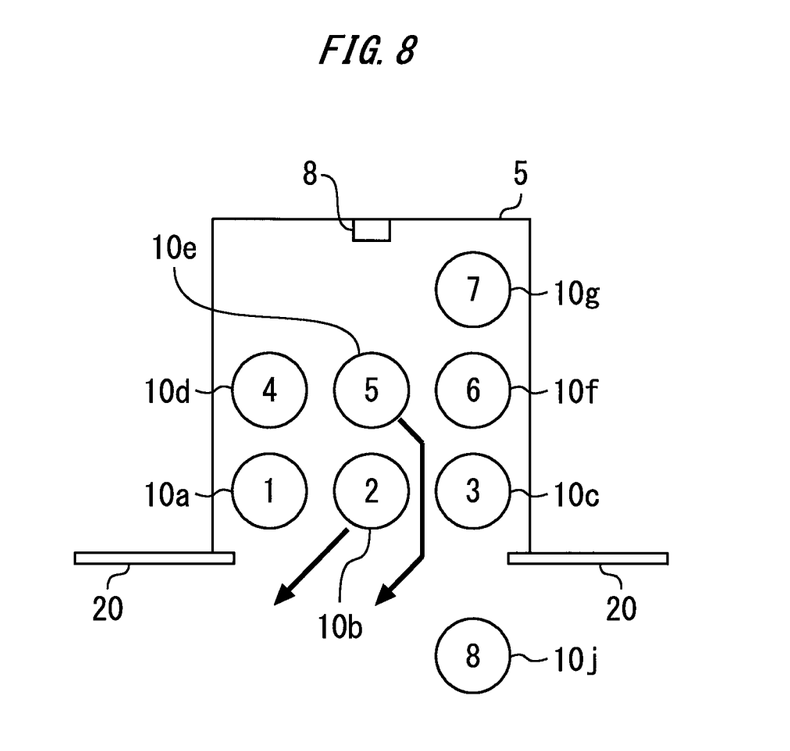
FIG. 8 is a sixth plan view illustrating rearrangement of the autonomous mobile bodies in Embodiment 1.
Figure 9:
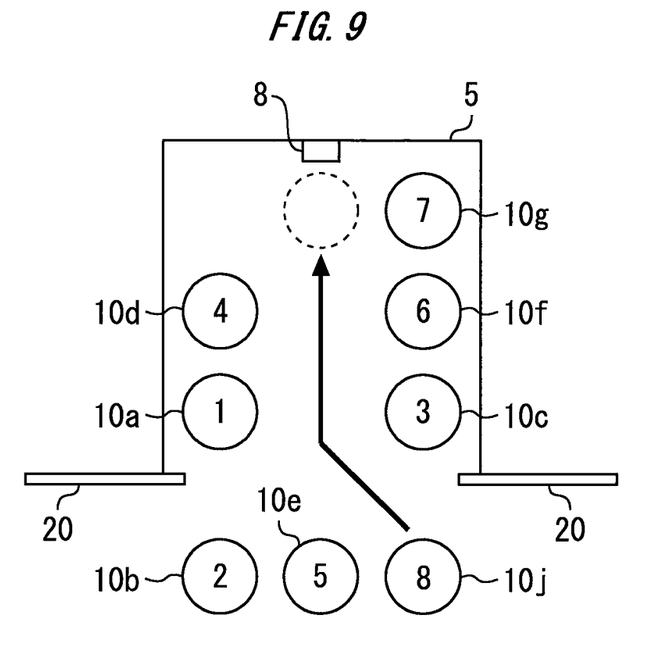
FIG. 9 is a seventh plan view illustrating rearrangement of the autonomous mobile bodies in Embodiment 1.
Figure 10:
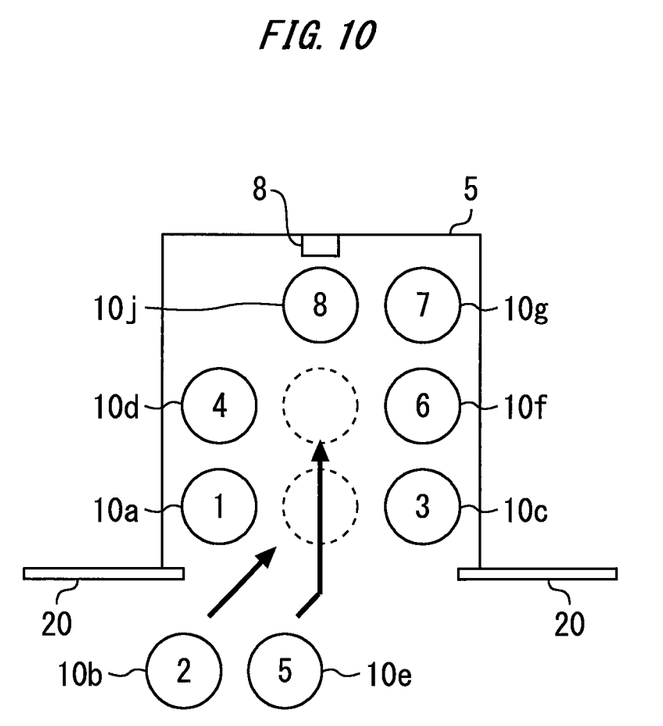
FIG. 10 is an eighth plan view illustrating rearrangement of the autonomous mobile bodies in Embodiment 1.

FIG. 8 is a sixth plan view illustrating rearrangement of the autonomous mobile bodies in Embodiment 1. FIG. 9 is a seventh plan view illustrating rearrangement of the autonomous mobile bodies in Embodiment 1. FIG. 10 is an eighth plan view illustrating rearrangement of the autonomous mobile bodies in Embodiment 1.

In FIGS. 8 to 10, the plurality of autonomous mobile bodies 10 are distinguished by reference numerals with alphabets. The numbers in circles showing the autonomous mobile bodies 10 indicate the alighting order of the autonomous mobile bodies 10. Now, with reference to FIGS. 3, 8, 9 and 10, a third specific example of the rearrangement of the autonomous mobile bodies 10 will be described.

FIGS. 8 to 10 show an autonomous mobile body 10*j* boarding the car 5 shown in FIG. 3. When the alighting order of the autonomous mobile body 10*j* is determined to be eighth, the alighting order of the autonomous mobile bodies 10 in the car 5 shown in FIG. 3 is not changed. However, a wait instruction is transmitted to the autonomous mobile bodies 10*b*, 10*e* so as not to prevent the autonomous mobile body 10*j* from boarding. In this case, the autonomous mobile bodies 10*b*, 10*e* are moved outside the car 5 as shown by arrows in FIG. 8. The autonomous mobile body 10*j* passes through a space created by the autonomous mobile bodies 10*b*, 10*e* being moved, and boards the car 5 on the back position as shown by an arrow in FIG. 9. Then, the autonomous mobile bodies 10*b*, 10*e* are moved to their original positions in the car 5 as shown by arrows in FIG. 10.

Figure 11:
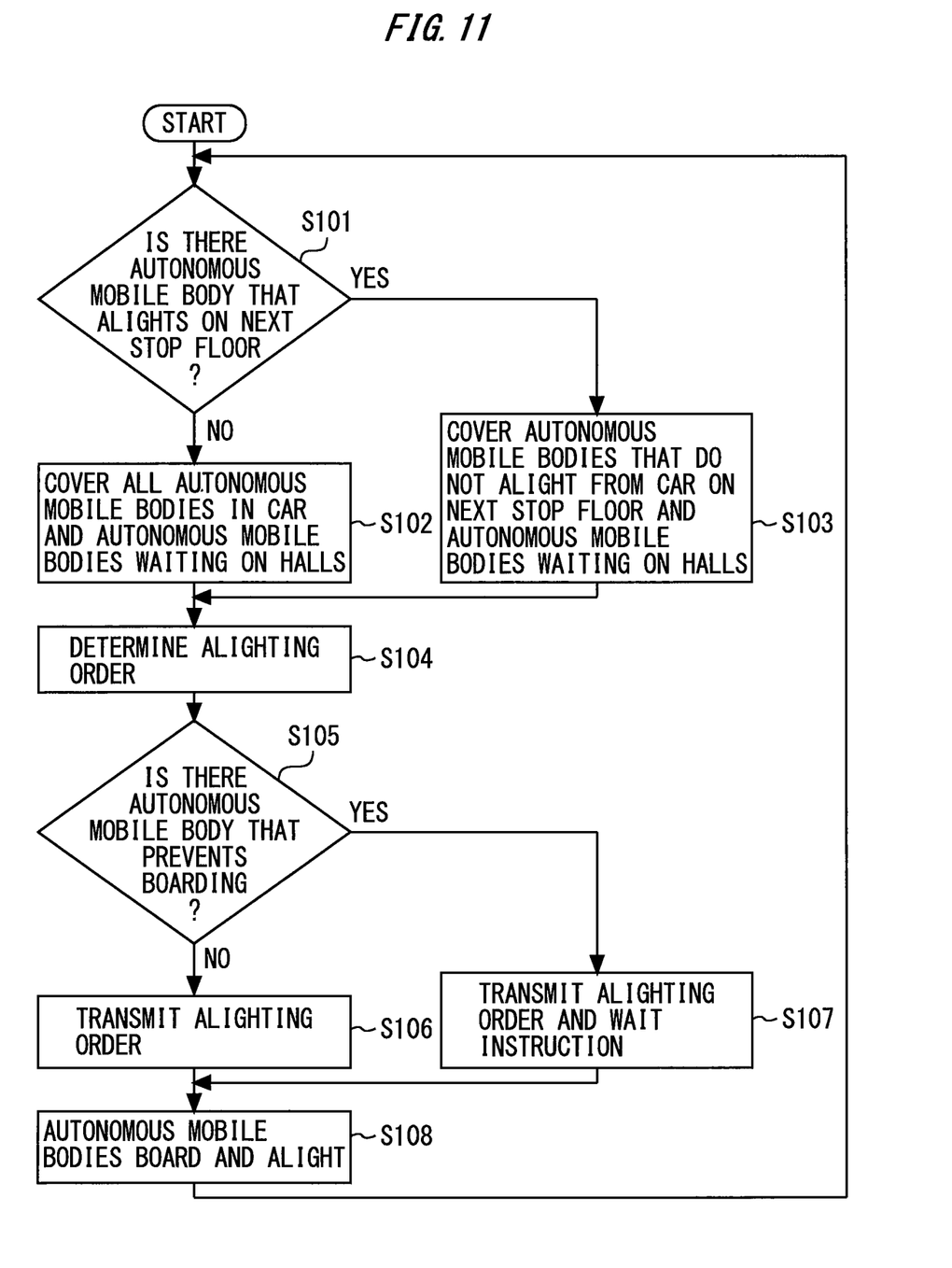
FIG. 11 is a flowchart of an exemplary operation of the elevator system according to Embodiment 1.

FIG. 11 is a flowchart of an exemplary operation of the elevator system according to Embodiment 1.

The control panel 7 determines whether or not there is an autonomous mobile body 10 that alights on the next stop floor (step S101).

When it is determined in step S101 that there is no autonomous mobile body 10 that alights on the next stop floor, the control panel 7 covers all the autonomous mobile bodies 10 in the car 5 and the autonomous mobile bodies 10 waiting on the halls (step S102). When it is determined in step S101 that there is an autonomous mobile body 10 that alights on the next stop floor, the control panel 7 covers the autonomous mobile bodies 10 that do not alight from the car 5 on the next stop floor and the autonomous mobile bodies 10 waiting on the halls (step S103).

Subsequent to step S102 or step S103, the control panel 7 determines an alighting order (step S104). Subsequent to step S104, the control panel 7 determines whether or not there is an autonomous mobile body 10 that prevents another autonomous mobile body 10 from boarding the car 5 from the hall (step S105).

When it is determined in step S105 that there is no autonomous mobile body 10 that prevents another autonomous mobile body 10 from boarding the car 5 from the hall, the control panel 7 transmits the alighting order (step S106). When it is determined in step S105 that there is an autonomous mobile body 10 that prevents another autonomous mobile body 10 from boarding the car 5 from the hall, the control panel 7 transmits the alighting order and a wait instruction (step S107).

When the car 5 reaches the stop floor, the autonomous mobile bodies 10 board and alight based on the processing in step S106 or step S107 (step S108). After step S108, the processing in step S101 is performed.

In Embodiment 1, the operation control unit 15 moves and stops the car 5 based on destination floor information transmitted from the autonomous mobile body 10. The target selection unit 17 selects one or more autonomous mobile bodies 10 in the car 5 and one or more autonomous mobile bodies 10 that will board the car 5 as the targets to be rearranged. The alighting order determination unit 18 determines the alighting order of the autonomous mobile bodies 10 to be rearranged based on the destination floor of each of the autonomous mobile bodies 10 to be rearranged selected by the target selection unit 17. The rearrangement instruction unit 19 transmits information indicating the alighting order determined by the alighting order determination unit 18 to each of the autonomous mobile bodies 10 to be rearranged. Thus, according to Embodiment 1, the plurality of autonomous mobile bodies 10 can be rearranged in the alighting order in the car 5. As a result, the plurality of autonomous mobile bodies can be efficiently moved in the building using the elevator.

In Embodiment 1, the target selection unit 17 selects the autonomous mobile body 10 whose destination floor is not the next stop floor among one or more autonomous mobile bodies 10 in the car 5 as the target to be rearranged. The target selection unit 17 does not select the autonomous mobile body 10 whose destination floor is the next stop floor among one or more autonomous mobile bodies 10 in the car 5 as the target to be rearranged. Thus, according to Embodiment 1, the alighting order can be updated to a correct order every time the autonomous mobile body 10 alights on the stop floor.

In Embodiment 1, the alighting order determination unit 18 estimates the autonomous mobile body 10 that prevents another autonomous mobile body 10 from boarding the car 5 among the autonomous mobile bodies 10 on board the car 5 and to be rearranged. The rearrangement instruction unit 19 transmits the instruction to wait outside the car 5 to the autonomous mobile body 10 estimated to prevent another autonomous mobile body 10 from boarding the car 5 by the alighting order determination unit 18. Thus, according to Embodiment 1, even if the car 5 is congested, the autonomous mobile bodies 10 can be rearranged in the alighting order.

In Embodiment 1, the travel control unit 13 of the autonomous mobile body 10 operates the travel mechanism of the autonomous mobile body 10, for example, based on the information transmitted from the rearrangement instruction unit 19 and the detection result by the detection unit 12 to change the position of the autonomous mobile body 10 relative to the positions of other autonomous mobile bodies 10. Thus, according to Embodiment 1, the plurality of autonomous mobile bodies 10 can be smoothly rearranged in the car 5.

In Embodiment 1, the alighting order determination unit 18 may determine the alighting order, for example, based on priority previously set for each autonomous mobile body 10. When a plurality of autonomous mobile bodies 10 having the same destination floor are included in the targets to be rearranged, the alighting order determination unit 18 may determine the alighting order, for example, so that the alighting order of the autonomous mobile body 10 having high priority is earlier.

In Embodiment 1, the alighting order determination unit 18 may determine the alighting order, for example, based on the size of the autonomous mobile body 10. When a plurality of autonomous mobile bodies 10 having the same destination floor and having different sizes are included in the targets to be rearranged, the alighting order determination unit 18 may determine the alighting order, for example, so that the alighting order of the autonomous mobile body 10 having a larger size is earlier. When a plurality of autonomous mobile bodies 10 having the same destination floor and having different sizes are included in the targets to be rearranged, the alighting order determination unit 18 may determine the alighting order, for example, so that the alighting order of the autonomous mobile body 10 having a smaller size is earlier.

In Embodiment 1, the control panel 7 may determine a boarding position of the autonomous mobile body 10 in the car 5, for example, based on the alighting order of the autonomous mobile body 10. The travel control unit 13 of the autonomous mobile body 10 may, for example, move the autonomous mobile body 10 in the car 5 so that the autonomous mobile body 10 is located in the boarding position determined by the control panel 7.

Figure 12:
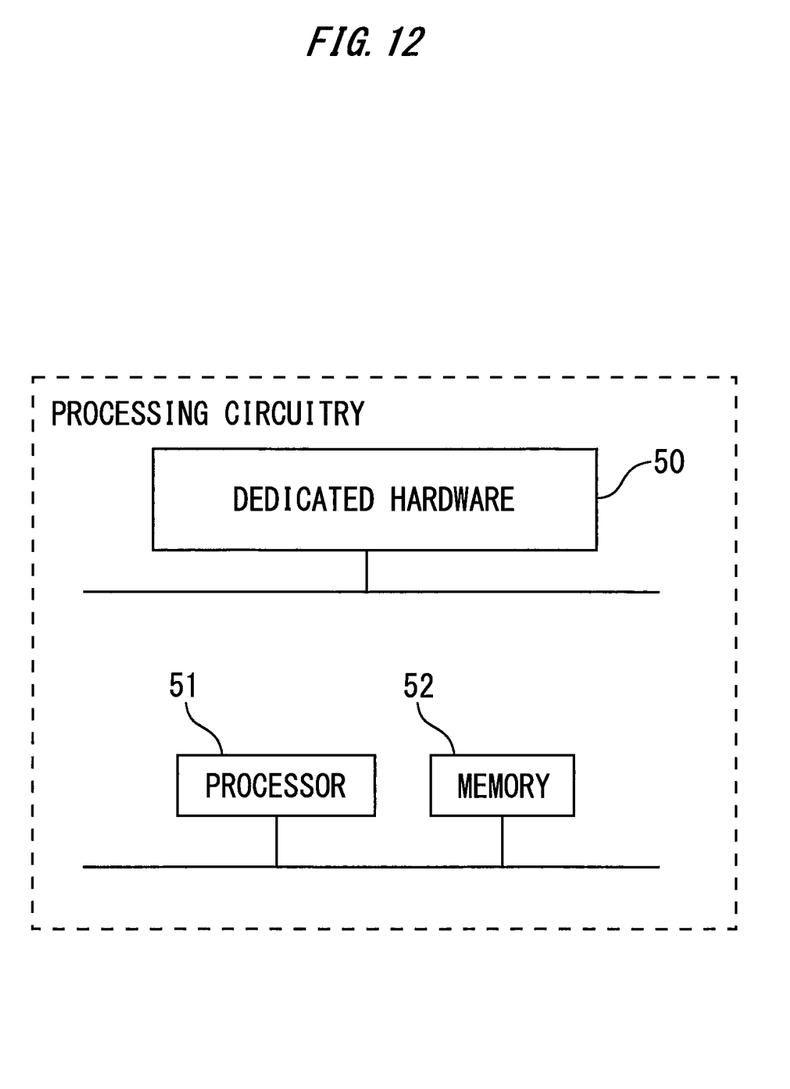
FIG. 12 is a hardware configuration diagram of a control panel.

FIG. 12 is a hardware configuration diagram of the control panel.

The individual functions of the operation control unit 15, the storage unit 16, the target selection unit 17, the alighting order determination unit 18, and the rearrangement instruction unit 19 in the control panel 7 are implemented by a processing circuitry. The processing circuitry may be dedicated hardware 50. The processing circuitry may include a processor 51 and a memory 52. Part of the processing circuitry may be formed as the dedicated hardware 50, and the processing circuitry may further include the processor 51 and the memory 52. FIG. 12 shows an example in the case where part of the processing circuitry is formed as the dedicated hardware 50, and the processing circuitry includes the processor 51 and the memory 52.

In the case where at least part of the processing circuitry is at least one dedicated hardware 50, the processing circuitry corresponds to, for example, a single circuit, a composite circuit, a programmed processor, a parallel-programmed processor, an ASIC, an FPGA, or combinations thereof.

In the case where the processing circuitry includes at least one processor 51 and at least one memory 52, the individual functions of the operation control unit 15, the storage unit 16, the target selection unit 17, the alighting order determination unit 16, and the rearrangement instruction unit 19 are implemented by software, firmware, or a combination of software and firmware. The software and the firmware are described as programs and stored in the memory 52. The processor 51 implements the functions of the individual units by reading and executing the programs stored in the memory 52. The processor 51 is also referred to as a CPU (Central Processing Unit), a central processor, a processing unit, an arithmetic unit, a microprocessor, a microcomputer, or a DSP. The memory 52 corresponds to, for example, a non-volatile or volatile semiconductor memory such as a RAM, a ROM, a flash memory, an EPROM, or an EEPROM, a magnetic disk, a flexible disk, an optical disk, a compact disc, a mini disc, a DVD, or the like.

Thus, the processing circuitry can implement the individual functions of the control panel 7 by the hardware, the software, the firmware, or combinations thereof. Note that the individual functions of the communication unit 11, the detection unit 12, the travel control unit 13, and the destination floor registration unit 14 of the autonomous mobile body 10 are also implemented by a processing circuitry similar to the processing circuitry shown in FIG. 12.

INDUSTRIAL APPLICABILITY

As described above, the present invention can be applied to an elevator including a car which and from which autonomous mobile bodies can board and alight.

REFERENCE SIGNS LIST 1 elevator system
2 hoistway
3 traction machine
4 ropes
5 car
6 counterweight
7 control panel
8 car communication device
9 exterior communication device
10 autonomous mobile body
10a autonomous mobile body
10b autonomous mobile body
10c autonomous mobile body
10d autonomous mobile body
10e autonomous mobile body
10f autonomous mobile body
10g autonomous mobile body
10h autonomous mobile body
10i autonomous mobile body
10j autonomous mobile body
11 communication unit
12 detection unit
13 travel control unit
14 destination floor registration unit
15 operation control unit
16 storage unit
17 target selection unit
18 alighting order determination unit
19 rearrangement instruction unit
20 car door
50 dedicated hardware
51 processor
52 memory

The invention claimed is:

1. A system for use with an elevator, comprising:
processing circuitry configured to:
move and stop an elevator car based on information indicating destination floors transmitted from autonomous mobile bodies that can board and alight from the car,
select an autonomous mobile body in the car and an autonomous mobile body that will board the car as targets to be rearranged,
determine an alighting order of the autonomous mobile bodies to be rearranged based on the destination floor of each of the autonomous mobile bodies to be rearranged, and
transmit information indicating the alighting order to each of the autonomous mobile bodies to be rearranged so that the autonomous mobile bodies are arranged one by one in the alighting order.

2. The system according to claim 1, wherein:
the processing circuitry selects an autonomous mobile body whose destination floor is not a next stop floor among the autonomous mobile bodies in the car as a target to be rearranged, and does not select an autonomous mobile body whose destination floor is the next stop floor among the autonomous mobile bodies in the car as a target to be rearranged.

3. The system according to claim 1, wherein:
the processing circuitry estimates an autonomous mobile body that prevents another autonomous mobile body from boarding the car among the autonomous mobile bodies to be rearranged, and
the processing circuitry transmits an instruction to wait outside the car to the autonomous mobile body estimated to prevent another autonomous mobile body from boarding the car.

4. The system according to claim 1, wherein:
the autonomous mobile body changes a position of the autonomous mobile body relative to positions of other autonomous mobile bodies based on the information transmitted from the processing circuitry.

5. The system according to claim 2, wherein:
the processing circuitry estimates an autonomous mobile body that prevents another autonomous mobile body from boarding the car among the autonomous mobile bodies to be rearranged, and the processing circuitry transmits an instruction to wait outside the car to the autonomous mobile body estimated to prevent another autonomous mobile body from boarding the car.

6. The system according to claim 2, wherein:
the autonomous mobile body changes a position of the autonomous mobile body relative to positions of other autonomous mobile bodies based on the information transmitted from the processing circuitry.

7. The system according to claim 3, wherein:
the autonomous mobile body changes a position of the autonomous mobile body relative to positions of other autonomous mobile bodies based on the information transmitted from the processing circuitry.

8. The system according to claim 5, wherein:
the autonomous mobile body changes a position of the autonomous mobile body relative to positions of other autonomous mobile bodies based on the information transmitted from the processing circuitry.

9. A method, comprising:
moving and stopping an elevator car based on information indicating destination floors transmitted from autonomous mobile bodies that can board and alight from the car, selecting an autonomous mobile body in the car and an autonomous mobile body that will board the car as targets to be rearranged, determining an alighting order of the autonomous mobile bodies to be rearranged based on the destination floor of each of the autonomous mobile bodies to be rearranged, and transmitting information indicating the alighting order to each of the autonomous mobile bodies to be rearranged so that the autonomous mobile, bodies are arranged one by one in the alighting order.

10. The method according to claim 9, further comprising:
selecting an autonomous mobile body whose destination floor is not a next stop floor among the autonomous mobile bodies in the car as a target to be rearranged, and not selecting an autonomous mobile body whose destination floor is the next stop floor among the autonomous mobile bodies in the car as a target to be rearranged.

11. The method according to claim 9, further comprising:
estimating an autonomous mobile body that prevents another autonomous mobile body from boarding the car among the autonomous mobile bodies to be rearranged, and transmitting an instruction to wait outside the car to the autonomous mobile body estimated to prevent another autonomous mobile body from boarding the car.

12. The method according to claim 9, further comprising:
changing a position of the autonomous mobile body relative to positions of other autonomous mobile bodies based on the information which has been transmitted.

13. The method according to claim 10, further comprising:
estimating an autonomous mobile body that prevents another autonomous mobile body from boarding the car among the autonomous mobile bodies to be rearranged, and transmitting an instruction to wait outside the car to the autonomous mobile body estimated to prevent another autonomous mobile body from boarding the car.

14. The method according to claim 10, further comprising:
changing a position of the autonomous mobile body relative to positions of other autonomous mobile bodies based on the information which has been transmitted.

15. The method according to claim 11, further comprising:
changing a position of the autonomous mobile body relative to positions of other autonomous mobile bodies based on the information which was transmitted.

16. The method according to claim 12, further comprising:
changing a position of the autonomous mobile body relative to positions of other autonomous mobile bodies based on the information which was transmitted.

\* \* \* \* \*